(12) United States Patent
Lam et al.

(10) Patent No.: US 11,012,252 B2
(45) Date of Patent: May 18, 2021

(54) ACTIVE ETHERNET CABLE

(71) Applicant: CREDO TECHNOLOGY GROUP LIMITED, Grand Cayman (KY)

(72) Inventors: Yattung Lam, San Jose, CA (US); Baohua Chen, Xiamen (CN)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/539,910

(22) Filed: Aug. 13, 2019

(65) Prior Publication Data
US 2020/0280458 A1  Sep. 3, 2020

(30) Foreign Application Priority Data
Mar. 1, 2019  (CN) .......................... 201910155535.9

(51) Int. Cl.
*H01R 13/52* (2006.01)
*H04L 12/28* (2006.01)
(Continued)

(52) U.S. Cl.
CPC .... *H04L 12/2801* (2013.01); *H04L 25/03885* (2013.01); *H04L 25/4917* (2013.01)

(58) Field of Classification Search
CPC ............. H04L 12/2801; H04L 25/4917; H04L 25/03885
See application file for complete search history.

(56) References Cited

U.S. PATENT DOCUMENTS 7,049,937 B1 * 5/2006 Zweig .................. H01R 13/641
  324/66
7,401,985 B2   7/2008 Aronson et al.
(Continued)

FOREIGN PATENT DOCUMENTS

CN     111641090 A    9/2020

OTHER PUBLICATIONS

Rumer, B. "Fighting Jitter in Fibre-Channel Designs." Electronic Engineering Times, (Feb. 1, 2001). Retrieved Aug. 13, 2019, from https://www.eetimes.com/document.asp?doc_id=1277249.
(Continued)

*Primary Examiner* — Dac V Ha
(74) *Attorney, Agent, or Firm* — Ramey & Schwaller, LLP; Daniel J. Krueger

(57) ABSTRACT

Accordingly, there are disclosed herein architectures and communication methods that enable mass-manufactured cables to perform robustly at per-lane PAM4 symbol rates up to 56 GBd and beyond. One illustrative cable embodiment includes conductor pairs connected between a first connector and a second connector. The first and second connectors are each adapted to fit into an Ethernet port of a corresponding host device to receive from that host device an electrical input signal conveying an inbound data stream to the cable, and to provide to that host device an electrical output signal conveying an outbound data stream from the cable. The first and second connectors each include a respective transceiver that performs clock and data recovery on the electrical input signal to extract and re-modulate the inbound data stream for transit via the conductor pairs as a respective electrical transit signal conveying a transit data stream.

14 Claims, 4 Drawing Sheets

(51) Int. Cl.
*H04L 25/49* (2006.01)
*H04L 25/03* (2006.01)

(56) References Cited

U.S. PATENT DOCUMENTS

| | | | |
|---|---|---|---|
| 9,230,416 B2* | 1/2016 | Ward | G08B 5/00 |
| 9,322,704 B1 | 4/2016 | Neveux | |
| 9,337,993 B1 | 5/2016 | Lugthart et al. | |
| 2007/0237464 A1 | 10/2007 | Aronson | |
| 2013/0343400 A1 | 12/2013 | Lusted | |
| 2014/0086264 A1 | 3/2014 | Lusted | |
| 2014/0146833 A1 | 5/2014 | Lusted | |
| 2015/0334186 A1 | 11/2015 | Chen | |
| 2016/0197434 A1* | 7/2016 | Lett | H01R 13/516 348/373 |
| 2018/0241579 A1* | 8/2018 | Lin | H04L 12/10 |
| 2020/0280329 A1 | 9/2020 | Lam et al. | |
| 2020/0280458 A1 | 9/2020 | Lam et al. | |

OTHER PUBLICATIONS

IEEE P802.3cd/D1.2, Feb. 3, 2017 (Amendment of IEEE Std 802.3-2015 as amended) IEEE Draft Standard for Ethernet Amendment: Media Access Control Parameters for 50 Gb/s, 100 Gb/s and 200 Gb/s Operation. The Institute of Electrical and Electronics Engineers, Inc., 2017; S.I.: IEEE.

Non-Final Office Action in U.S. Appl. No. 16/541,094 dated Sep. 9, 2020.

Corresponds to U.S. Appl. No. 16/698,935 dated Nov. 27, 2019.

Corresponds to U.S. Appl. No. 16/541,094 dated Aug. 14, 2019.

Corresponds to U.S. Appl. No. 16/693,144 dated Nov. 22, 2019.

Notice of Allowance dated Oct. 15, 2020 for U.S. Appl. No. 16/698,935.

Supplemental Notice of Allowance dated Nov. 6, 2020 for U.S. Appl. No. 16/698,935.

* cited by examiner

ACTIVE ETHERNET CABLE

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This Ethernet standard provides a common media access control specification for local area network (LAN) operations at selected speeds from 1 Mb/s to 100 Gb/s over coaxial cable, twinaxial cable, twisted wire pair cable, fiber optic cable, and electrical backplanes, with various channel signal constellations. As demand continues for ever-higher data rates, the standard is being extended. Such extensions to the standard must account for increased channel attenuation and dispersion even as the equalizers are forced to operate at faster symbol rates. It is becoming increasingly difficult to provide affordable, mass-manufactured network hardware that assures consistently robust performance as the proposed per-lane bit rates rise beyond 50 Gbps with PAM4 or larger signal constellations.

SUMMARY

Accordingly, there are disclosed herein architectures and communication methods that enable mass-manufactured cables to perform robustly at per-lane PAM4 symbol rates up to 26.5625 GBd and beyond. One illustrative cable embodiment includes electrical conductors connected between a first connector and a second connector. The first and second connectors are each adapted to fit into an Ethernet port of a corresponding host device to receive from that host device an electrical input signal conveying an inbound data stream to the cable, and to provide to that host device an electrical output signal conveying an outbound data stream from the cable. The first and second connectors each include a respective transceiver that performs clock and data recovery on the electrical input signal to extract and re-modulate the inbound data stream for transit via the electrical conductors as a respective electrical transit signal conveying a transit data stream.

One illustrative communication method embodiment includes, in a network cable having conductor pairs connecting a first connector to a second connector: receiving with the first connector a first electrical input signal conveying a first inbound data stream from a first host device; performing clock and data recovery on the first electrical input signal with a first transceiver in the first connector to extract the first inbound data stream; re-modulating the first inbound data stream as a first transit data stream conveyed by a first electrical transit signal over a first of the conductor pairs; receiving with the second connector a second electrical input signal conveying a second inbound data stream from a second host device; performing clock and data recovery on the second electrical input signal with a second transceiver in the second connector to extract the second inbound data stream; and re-modulating the second inbound data stream as a second transit data stream conveyed by a second electrical transit signal over a second of the conductor pairs.

One illustrative cable manufacturing method includes: connecting a first end and a second end of a set of conductor pairs to a first transceiver and a second transceiver, respectively, to transport a first electrical transit signal from the first transceiver to the second transceiver and a second electrical transit signal from the second transceiver to the first transceiver; packaging the first transceiver into a first connector configured to couple a first electrical input signal from a network interface port of a first host device to the first transceiver and a first electrical output signal from the first transceiver to the network interface port of the first host device; and packaging the second transceiver into a second connector configured to couple a second electrical input signal from a network interface port of a second host device to the second transceiver and a second electrical output signal from the second transceiver to the network interface port of the second host device, the first and second transceivers being configured to perform clock and data recovery on the first and second electrical input signal to extract and re-modulate the first and second inbound data streams respectively as the first and second electrical transit signals conveying first and second transit data streams.

Each of the foregoing embodiments may be implemented individually or in combination, and may be implemented with one or more of the following features in any suitable combination: 1. the respective transceiver for each of the first and second connectors performs clock and data recovery on the respective electrical transit signal to extract and re-modulate the transit data stream as the outbound data stream from the cable. 2. the respective transceivers each employ fixed, cable-independent, equalization parameters for each of: the remodulation of the transit data stream as the outbound data stream, and the clock and data recovery performed on the electrical input signal. 3. the respective transceivers each employ cable-dependent equalization parameters for at least one of: the remodulation of the inbound data stream for transit, and the clock and data recovery performed on the electrical transit signal. 4. the cable-dependent equalization parameters are adapted during usage of the cable. 5. said cable-dependent equalization parameters are fixed during normal usage of the cable. 6. said cable-dependent equalization parameters are determined during manufacturer-testing of the cable. 7. the inbound data stream and the outbound data stream each have a per-lane bit rate of 50 Gbps or more. 8. performing clock and data recovery on the first electrical transit signal with the second transceiver to extract the first transit data stream; and performing clock and data recovery on the second electrical transit signal with the first transceiver to extract the second transit data stream. 9. re-modulating the first transit data stream as a second outbound data stream conveyed by a second electrical output signal to the second host device; and re-modulating the second transit data stream as a first outbound data stream conveyed by a first electrical output signal to the first host device. 10. said re-modulating the first transit data stream, said re-modulating the second transit data stream, said performing clock and data recovery on the first electrical input signal, and said performing clock and data recovery on the second electrical input signal, each employ fixed, cable-independent, equalization parameters. 11. cable-dependent equalization parameters are employed for at least one of: re-modulating the first inbound data stream, re-modulating the second inbound data stream, said performing clock and data recovery on the first electrical transit signal, and said performing clock and data recovery on the second electrical transit signal. 12. determining said cable-dependent equalization parameters during manufacturer-testing of the network cable. 13. the first and second transceivers are configured to perform clock and data recovery on the second and first electrical transit signals to extract and re-modulate the second and first transit data streams as first and second outbound data streams conveyed by the first and second electrical output signals from the cable. 14. the first and second transceivers are each configured to employ fixed, cable-independent, equalization parameters for clock and data recovery on the respective electrical input signals and for generating the respective electrical output signals. 15. the first and second transceivers are each configured to employ cable-dependent equalization parameters for generating the first and second electrical transit signals and for clock and data recovery on the second and first electrical transit signals. 16. the first and second transceivers are each configured to adapt the cable-dependent equalization parameters during operation. 17. the first and second transceivers are each configured to use preset cable-dependent equalization parameters during operation. 18. testing an assembled cable to determine the cable-dependent equalization parameters.

DETAILED DESCRIPTION

Figure 1:
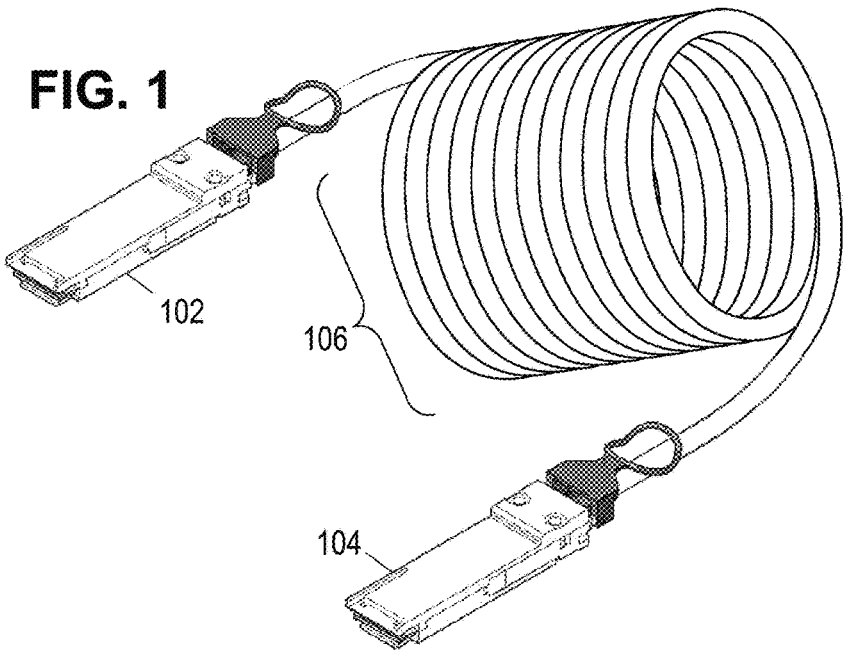
FIG. 1 is a perspective view of an illustrative active Ethernet cable.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a perspective view of an illustrative cable that may be used to provide a high-bandwidth communications link between devices in a routing network. The routing network may be or include, for example, the Internet, a wide area network, or a local area network. The linked devices may be computers, switches, routers, and the like. The cable includes a first connector 102 and a second connector 104 that are electrically connected via a cord 106. The cord 106 includes electrically conductive wires usually in a paired form such as with twinaxial conductors. Twinaxial conductors can be likened to coaxial conductors, but with two inner conductors instead of one. The inner conductors may be driven with a differential signal and their shared shield operates to reduce crosstalk with other twinaxial conductors in the cable. Depending on the performance criteria, it may be possible to employ other paired or single-ended conductor implementations.

Pursuant to the Ethernet standard, each conductor pair may provide unidirectional transport of a differential signal. To enable robust performance over even extended cable lengths (greater than, say, 3 m, 6 m, or 9 m), each connector 102, 104 may include a powered transceiver that performs clock and data recovery (CDR) and re-modulation of data streams in each direction. Notably, the transceivers perform CDR and re-modulation not only of the outbound data streams as they exit the cable, but also of the inbound data streams as they enter the cable.

It is acknowledged here that the inbound data streams may be expected to be compliant with the relevant standard and may be expected to have experienced essentially no deterioration from their traversal of the network interface port's receptacle pins and the cable assembly's connector plug pins. Nevertheless, the modulation quality and equalization strategy employed by the electronics manufacturer of the transmitting network interface is generally unknown and the minimum requirements of the standard may be inadequate for transport over an extended cable length, particularly if the electronics manufacturer of the receiving network interface is different than that of the transmitting network interface. As with the transmitting network interface, the equalization and demodulation strategy employed by the electronics manufacturer of the receiving network interface is generally unknown and may be unable to cope with the attenuation and interference caused by signal transport over an extended cable length. By performing CDR and re-modulation of both inbound and outbound data streams, the illustrative cable enables consistently robust data transfer over extended cable lengths can be assured without consideration of the electronics manufacturers of the network interfaces.

Figure 2:
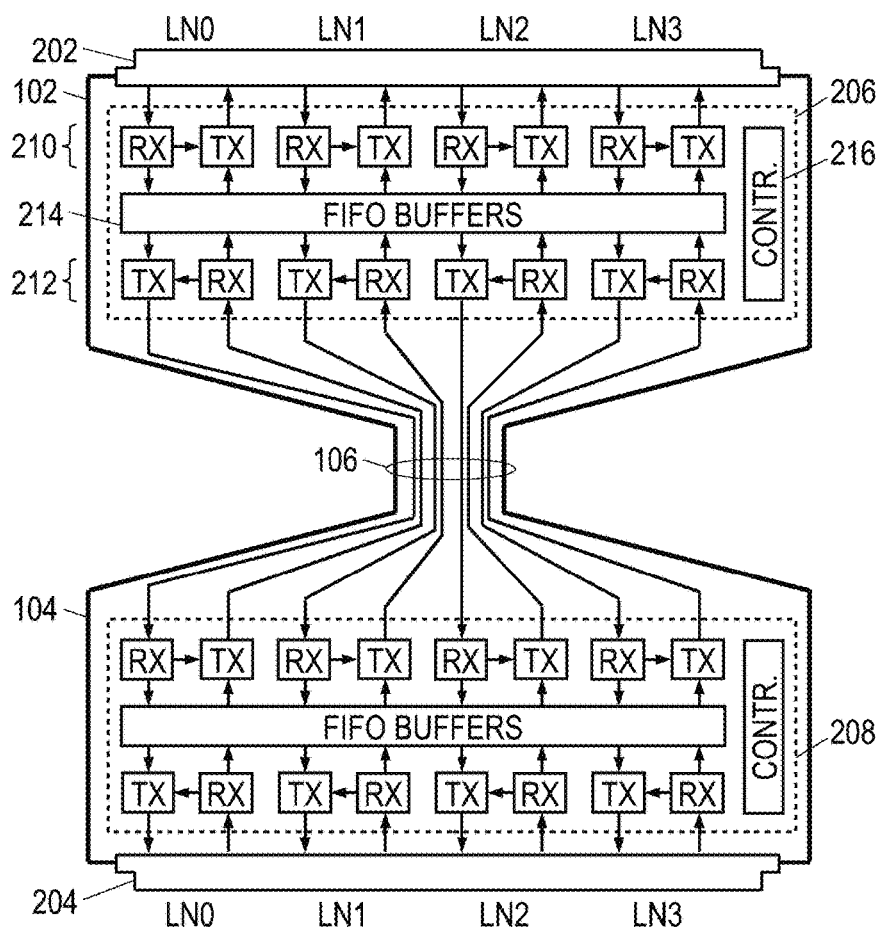
FIG. 2 is a function-block diagram of the illustrative cable.

FIG. 2 is a function-block diagram of the illustrative cable of FIG. 1. Connector 102 includes a plug 202 adapted to fit a standard-compliant Ethernet port in a first host device 302 (FIG. 3) to receive an inbound data stream as an electrical input signal from the host device and to provide an outbound data stream as an electrical output signal to the host device. Similarly, connector 104 includes a plug 204 that fits an Ethernet port of a second host device 304. Connector 102 includes a first transceiver 206 to perform CDR and re-modulation of the data streams entering and exiting the cable at connector 102, and connector 104 includes a second transceiver 208 to perform CDR and re-modulation of the data streams entering and exiting the cable at connector 104. The transceivers 206, 208 may be integrated circuits mounted on a printed circuit board and connected to plug pins via circuit board traces. The wires of cord 106 may be soldered to corresponding pads on the printed circuit board.

Each transceiver 206, 208, includes a set 210 of transmitters and receivers for communicating with the host device and a set 212 of transmitters and receivers for sending and receiving via conductor pairs running the length of the cable. The illustrated cable supports four bidirectional communication lanes LN0-LN3, each bidirectional lane formed by two unidirectional connections, each unidirectional connection having a differentially-driven twinaxial conductor pair (with a shield conductor not shown here). The transceivers optionally include a memory 214 to provide first-in first-out (FIFO) buffering between the transmitter & receiver sets 210, 212. A controller 216 coordinates the operation of the transmitters and receivers by, e.g., setting initial equalization parameters and ensuring the training phase is complete across all lanes and links before enabling the transmitters and receiver to enter the data transfer phase.

In at least some contemplated embodiments, the host-facing transmitter and receiver set 210 employ fixed equalization parameters that are cable-independent, i.e., they are not customized on a cable-by-cable basis. The center-facing transmitter and receiver set 212 preferably employ cable-dependent equalization parameters that are customized on a cable-by-cable basis. The cable-dependent equalization parameters may be adaptive or fixed, and initial values for these parameters may be determined during manufacturer tests of the cable. The equalization parameters may include filter coefficient values for pre-equalizer filters in the transmitters, and gain and filter coefficient values for the receivers.

Figure 3:
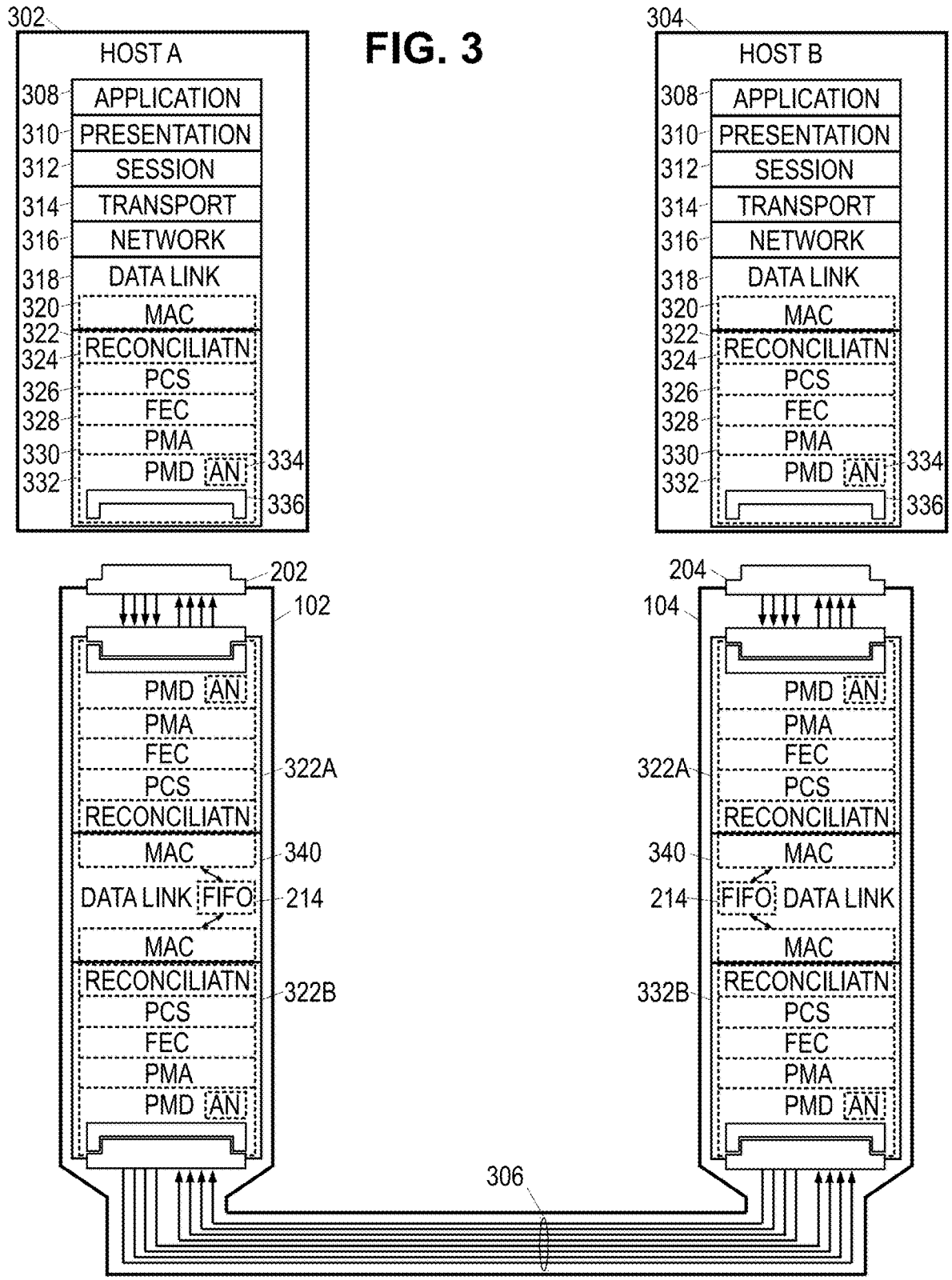
FIG. 3 is an architectural diagram for a communications link including the illustrative cable.

The illustrative cable of FIG. 2 may be a part of a point-to-point communications link between two host devices 302, 304 as shown in the architectural diagram of FIG. 3. FIG. 3 shows the architecture using the ISO/IEC Model for Open Systems Interconnection (See ISO/IEC 7498-1:1994.1) for communications over a physical medium such as the twinaxial conductor pairs represented by channels 306. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific hardware.

The Application Layer 308 is the uppermost layer in the model, and it represents the user applications or other software operating on different systems that need a facility for communicating messages or data. The Presentation Layer 310 provides such applications with a set of application programming interfaces (APIs) that provide formal syntax along with services for data transformations (e.g., compression), establishing communication sessions, connectionless communication mode, and negotiation to enable the application software to identify the available service options and select therefrom. The Session Layer 312 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 314 provides services for multiplexing, end-to-end sequence control, error detection, segmenting, blocking, concatenation, flow control on individual connections (including suspend/resume), and implementing end-to-end service quality specifications. The focus of the Transport Layer 314 is end-to-end performance/behavior. The Network Layer 316 provides a routing service, determining the links used to make the end-to-end connection and when necessary acting as a relay service to couple together such links. The Data link layer 318 serves as the interface to physical connections, providing delimiting, synchronization, sequence and flow control across the physical connection. It may also detect and optionally correct errors that occur across the physical connection. The Physical layer 322 provides the mechanical, electrical, functional, and procedural means to activate, maintain, and deactivate channels 306, and to use the channels 306 for transmission of bits across the physical media.

The Data Link Layer 318 and Physical Layer 322 are subdivided and modified slightly by IEEE Std 802.3-2015, which provides a Media Access Control (MAC) Sublayer 320 in the Data Link Layer 318 to define the interface with the Physical Layer 322, including a frame structure and transfer syntax. Within the Physical Layer 322, the standard provides a variety of possible subdivisions such as the one illustrated in FIG. 3, which includes an optional Reconciliation Sublayer 324, a Physical Coding Sublayer (PCS) 326, a Forward Error Correction (FEC) Sublayer 328, a Physical Media Attachment (PMA) Sublayer 330, a Physical Medium Dependent (PMD) Sublayer 332, and an Auto-Negotiation (AN) Sublayer 334.

The optional Reconciliation Sublayer 324 merely maps between interfaces defined for the MAC Sublayer 320 and the PCS Sublayer 326. The PCS Sublayer 326 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 322, the PCS alignment markers typically include Bit-Interleaved-Parity (BIP) values derived from the preceding bits in the lane up to and including the preceding PCS alignment marker.

The FEC Sublayer 328 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 328 modifies the number of lanes (Article 91 provides for a 20-to-4 lane conversion).

The PMA Sublayer 330 provides lane remapping, symbol encoding/decoding, framing, and octet/symbol synchronization. The PMD Sublayer 332 specifies the transceiver conversions between transmitted/received channel signals and the corresponding bit (or digital symbol) streams. An optional AN Sublayer 334 is shown as a internal element of the PMD Sublayer 332, and it implements an initial start-up of the communications channels, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. A receptacle 336 is also shown as part of the PMD sublayer 332 to represent the physical network interface port.

The connectors 102, 104, have plugs 202, 204 that mate with the receptacles 336 of the two host devices 302, 304. Within each connector, the transceivers may implement a host-facing Physical Layer 322A, a center-facing Physical Layer 322B, and a Data Link Layer 340 that bridges together the two Physical Layers. More information regarding the operation of the sublayers, as well as the electrical and physical specifications of the connections between the nodes and the communications medium (e.g., pin layouts, line impedances, signal voltages & timing), and the electrical and physical specifications for the communications medium itself (e.g., conductor arrangements in copper cable, limitations on attenuation, propagation delay, signal skew), can be found in the current Ethernet standard, and any such details should be considered to be well within the knowledge of those having ordinary skill in the art.

Figure 4:
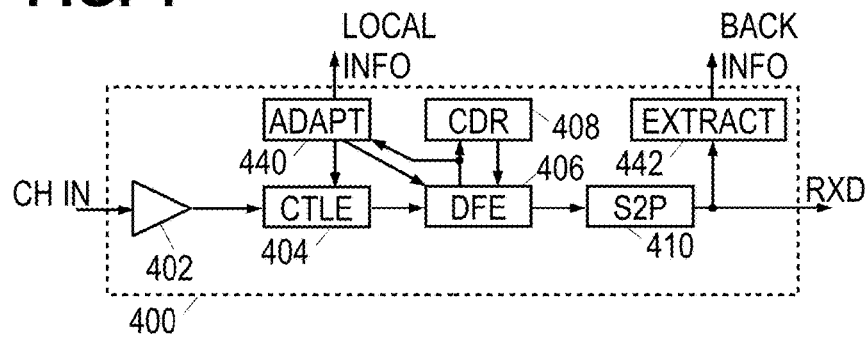
FIG. 4 is a block diagram of a receiver in an illustrative multi-lane transceiver.
Figure 5:
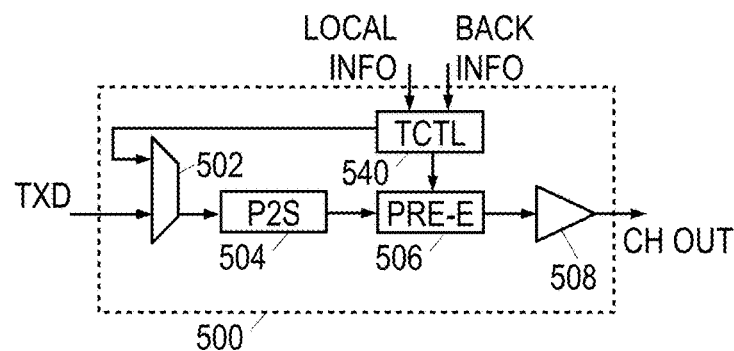
FIG. 5 is a block diagram of a transmitter in an illustrative multi-lane transceiver.

The MAC, Reconciliation, PCS, FEC, PMA, and PMD Sublayers, may be implemented as application-specific integrated circuitry to enable high-rate processing and data transmission. The receiver and transmitter sets 210, 212, may implement the PMA and PMD sublayers. FIGS. 4 and 5 are block diagrams of an illustrative receiver and an illustrative transmitter that may be part of the sets 210, 212.

In FIG. 4, receiver 400 receives an analog electrical signal (CH_IN) and supplies it to a low noise amplifier (LNA) 402. The LNA 402 provides a high input impedance to minimize channel loading and amplifies the received electrical signal to drive the input of a continuous time linear equalizer (CTLE) filter 404. CTLE 404 provides continuous time filtering to shape the signal spectrum to reduce the length of the channel impulse response while minimizing leading inter-symbol interference (ISI). A decision feedback equalizer (DFE) 406 operates on the filtered signal to correct for trailing ISI and detect each transmitted channel bit or symbol, thereby producing a demodulated digital data stream. Some embodiments employ oversampling. A clock and data recovery (CDR) circuit 408 extracts a clock signal from the filtered signal and/or the digital data stream and supplies it to DFE 406 to control sample and symbol detection timing. A serial-to-parallel circuit 410 groups the digital data stream bits or symbols into blocks to enable the use of lower clock rates for subsequent on-chip operations. The symbols or data blocks are placed on the digital receive bus (RXD) for retransmission to the remote end node by a transmitter.

While certain contemplated cable embodiments do not support auto-negotiation, other contemplated embodiments do support auto-negotiation in accordance with the Ethernet standard. When supported, the auto-negotiation may be implemented as described in PCT/CN2017/075961, titled "Ethernet link extension method and device" by inventors Yifei Dai, Haoli Qian, and Jeff Twombly, and filed 2017 Mar. 8. A detector or packet information extractor 442 monitors the receive signal for the end of the auto-negotiation phase and/or the beginning of the training phase frames.

During the training phase, a filter adaptation circuit 440 measures an error between the input and output of a decision element in DFE 406, employing that error in accordance with well-known techniques from the literature on adaptive filtering to determine adjustments for the coefficients in CTLE filter 404, DFE 406, and a transmit filter 506 (discussed further below), and to determine whether convergence has been achieved. The locally-generated information (LOCAL_INFO) including the transmit filter coefficient adjustments and the convergence status are provided to the local transmitter 500 that communicates in the reverse direction on the data lane. As discussed below, the local transmitter communicates the transmit filter adjustments and the convergence status via a back-channel to the source of the CH_IN signal. In that vein, the received signal includes back-channel information from the source of the CH_IN signal. A packet information extractor 442 detects the back-channel information (BACK_INFO) and passes it to the local transmitter. Once convergence is achieved, receiver 400 is ready to begin normal operations.

In FIG. 5, transmitter 500 receives blocks of channel bits or symbols for transmission to the source of the CH_IN signal (FIG. 4). During normal operations, multiplexer 502 supplies blocks of channel bits or symbols from the remote source (received on the TXD bus) to the parallel to serial (P2S) circuit 504. P2S circuit converts the blocks into a digital data stream. A transmit filter 506, also called a pre-emphasis filter, converts the digital data stream into an analog electrical signal with spectral shaping to combat channel degradation. Driver 508 amplifies the analog electrical signal to drive the channel output (CH_OUT) node.

If supported, the auto-negotiation phase may be implemented as set forth in Y. Dai et al. During the training phase, multiplexer 502 obstructs information from the TXD bus, instead supplying P2S circuit 504 with training frames from a training controller 540. The training controller 540 generates the training frames based on the convergence status and transmit filter coefficient adjustments (LOCAL_INFO) received from the local receiver 400. That is, in addition to training patterns, the training frames include backchannel information to be used by the remote end of the channel.

Note that even after the local receiver indicates filter convergence has occurred, the training controller 540 may prolong the training phase to coordinate training phase timing across lanes and along each link of the channel. The training frames include training sequences as specified by the relevant portions of the current Ethernet standard (IEEE Std 802.3).

The training controller 540 further accepts the back-channel information (BACK_INFO) extracted by the local receiver from received training frames sent by the local end node. The training controller applies the corresponding adjustments to the coefficients of transmit filter 506. Upon conclusion of the training phase, multiplexer 502 begins forwarding TXD blocks to the P2S circuit 504.

Figure 6:
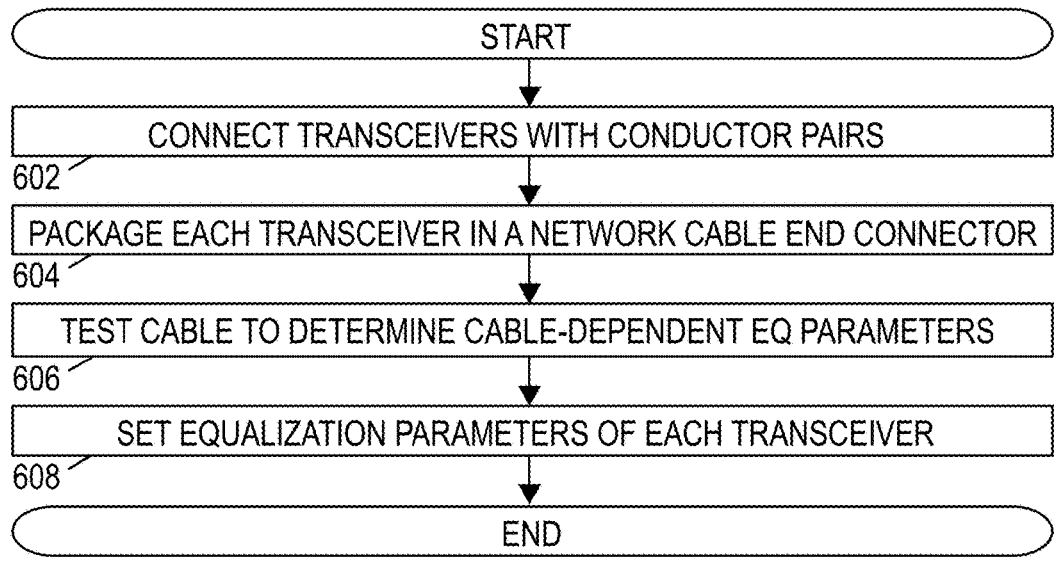
FIG. 6 is a flow diagram of an illustrative cable manufacturing method.

FIG. 6 is a flowchart of an illustrative cable manufacturing method. It begins in block 602 with connecting the ends of the conductor pairs to the first and second transceivers, typically by soldering the wire ends to pads of the circuit boards on which the transceivers are mounted. This and the ensuing steps may be performed by automated manufacturing/testing equipment. In block 604, the equipment packages each transceiver in a respective end connector for the network cable. The connectors are adapted to mate with network interface ports of host devices, and include plugs that electrically connect with matching receptacles in the ports.

In block 606, the equipment tests the cable to verify compliance with performance specifications and to determine cable-dependent equalization parameters for use by the center-facing transmitter and receiver sets 212. In block 608, the equipment causes the transceivers to store the equalization parameters (including both cable-dependent and cable-independent parameters) in nonvolatile memory. The cable may then be packaged and sold to customers expecting robust performance between host devices made by a range of different manufacturers.

Figure 7:
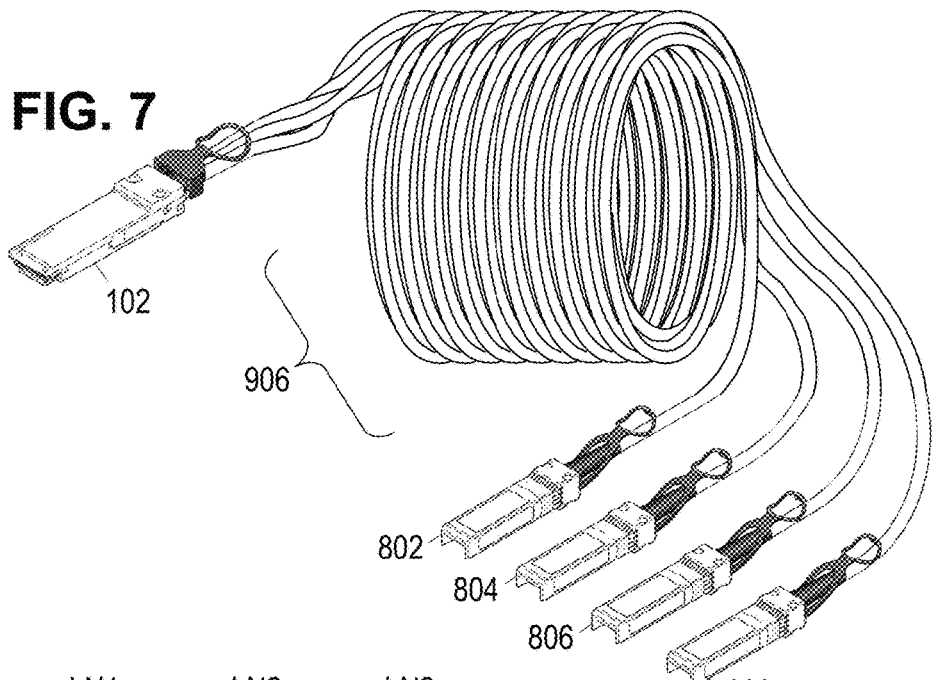
FIG. 7 is a perspective view of an illustrative active 1:4 breakout cable.
Figure 8:
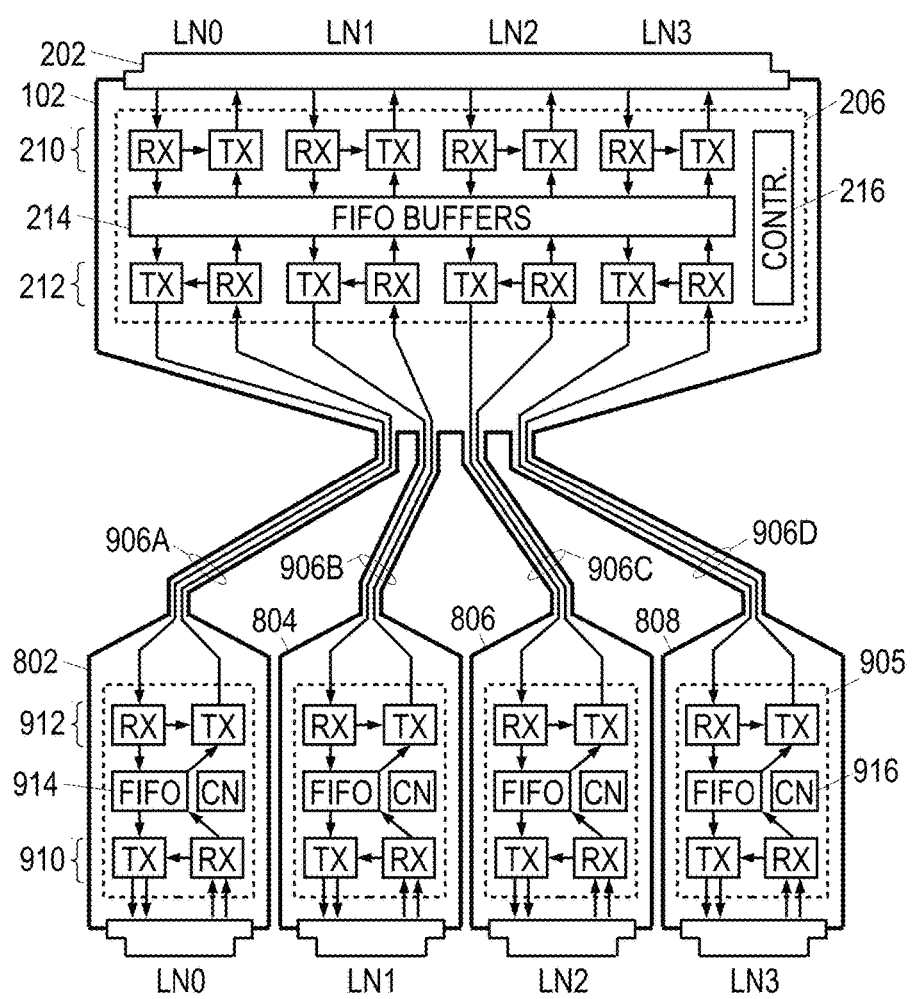
FIG. 8 is a function-block diagram of the illustrative 1:4 breakout cable.

Though a two-ended cable has been used in the foregoing description, the disclosed principles are also applicable to other cable designs, including the 1:4 breakout cable design of FIGS. 7 and 8. FIG. 7 is a perspective view of the breakout cable having a first connector 102 which may be designed for sending and receiving a 200 Gbps Ethernet data stream, e.g., in the form of 4 lanes of 50 Gbps, each lane using PAM4 at 26.5625 GBd. Four cords 906 may each carry 1 lane of 50 Gbps or 2 lanes of 25 Gbps, each lane using PAM4 at 26.5625 GBd or non-return to zero (NRZ) signaling at 26.5625 GBd. Each of the connectors 802-808 may be designed for sending and receiving a 50 Gbps Ethernet data stream. Such breakout cables are useful for linking host devices designed to different generations of the Ethernet standard. As another example, the first connector may be designed for sending and receiving 400 Gbps (8 lanes of 50 Gbps PAM4), while each of the remaining connectors may be designed for sending and receiving 100 Gbps (4 lanes of 25 Gbps NRZ).

FIG. 8 shows a block diagram of the 1:4 breakout cable. In the example of FIG. 8, connector 102 supports 4 lanes while each of the other connectors 802-808 supports one lane. Connectors 802-808 accordingly include transceivers 905 each having a single host-facing lane and a single center-facing lane supported by host-facing transmitter and receiver sets 910 and center-facing transmitter and receiver sets 912. Though not explicitly shown here, the host-facing transmitter and receiver sets 910 may include "gearbox" functions that convert 1 lane of PAM4 symbols into 2 lanes of NRZ symbols, and vice versa. FIFO buffers 914 bridge together the host-facing and center-facing sets, and operation of the transmitter and receiver sets is coordinated by controllers 916.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An active Ethernet cable that comprises:
electrical conductors connected between a first connector and a second connector,
each of the first and second connectors being adapted to fit into an Ethernet port of a corresponding host device to receive from that host device an electrical input signal conveying an inbound data stream to the cable and to provide to that host device an electrical output signal conveying an outbound data stream from the cable,
each of the first and second connectors including a respective transceiver that performs clock and data recovery on the electrical input signal to extract and re-modulate the inbound data stream for transit via the electrical conductors as a respective electrical transit signal conveying a transit data stream,
the respective transceiver for each of the first and second connectors performing clock and data recovery on the respective electrical transit signal to extract and re-modulate the transit data stream as the outbound data stream from the cable, and
the respective transceivers each employing fixed, cable-independent, equalization parameters for each of: the remodulation of the transit data stream as the outbound data stream, and the clock and data recovery performed on the electrical input signal.

2. The active Ethernet cable of claim 1, wherein the respective transceivers each employ cable-dependent equalization parameters for at least one of: the remodulation of the inbound data stream for transit, and the clock and data recovery performed on the electrical transit signal.

3. The active Ethernet cable of claim 2, wherein said cable-dependent equalization parameters adapt during usage of the Ethernet cable.

4. The active Ethernet cable of claim 2, wherein said cable-dependent equalization parameters are fixed during normal usage of the Ethernet cable, and wherein said cable-dependent equalization parameters are determined during manufacturing-testing of the Ethernet cable.

5. The active Ethernet cable of claim 4, wherein the inbound data stream and the outbound data stream each have a per-lane symbol rate in excess of 50 GBd.

6. A communication method that comprises, in a network cable having conductor pairs electrically connecting a first connector to a second connector:
receiving with the first connector a first electrical input signal conveying a first inbound data stream from a first host device;
performing clock and data recovery on the first electrical input signal with a first transceiver in the first connector to extract the first inbound data stream;
re-modulating the first inbound data stream as a first transit data stream conveyed by a first electrical transit signal over a first of the conductor pairs;
receiving with the second connector a second electrical input signal conveying a second inbound data stream from a second host device;
performing clock and data recovery on the second electrical input signal with a second transceiver in the second connector to extract the second inbound data stream;
re-modulating the second inbound data stream as a second transit data stream conveyed by a second electrical transit signal over a second of the conductor pairs;
performing clock and data recovery on the first electrical transit signal with the second transceiver to extract the first transit data stream;
re-modulating the first transit data stream as a second outbound data stream conveyed by a second electrical output signal to the second host device;
performing clock and data recovery on the second electrical transit signal with the first transceiver to extract the second transit data stream; and
re-modulating the second transit data stream as a first outbound data stream conveyed by a first electrical output signal to the first host device,
wherein said re-modulating the first transit data stream, said re-modulating the second transit data stream, said performing clock and data recovery on the first electrical input signal, and said performing clock and data recovery on the second electrical input signal, each employ fixed, cable-independent, eaualization parameters.

7. The communication method of claim 6, wherein cable-dependent equalization parameters are employed for at least one of: re-modulating the first inbound data stream, re-modulating the second inbound data stream, said peforming clock and data recovery on the first electrical transit signal, and said performing clock and data recovery on the second electrical input signal, each employ fixed, cable-independent, equalization parameters.

8. The communication method of claim 7, wherein said cable-dependent equalization parameters are adaptively updated.

9. The communication method of claim 7, wherein said cable-dependent equalization parameters are fixed during normal usage, and wherein the method further comprises: determining said cable-dependent equalization parameters during manufacturer-testing of the network cable.

10. The communication method of claim 9, wherein the first inbound data stream has a per-lane symbol rate in excess of 50 GBd.

11. A cable manufacturing method that comprises:
connecting a first end and a second end of a set of conductor pairs to a first transceiver and a second transceiver, respectively, to transport a first electrical transit signal from the first transceiver to the second transceiver and a second electrical transit signal from the second transceiver to the first transceiver;
packaging the first transceiver into a first connector configured to couple a first electrical input signal from a network interface port of a first host device to the first transceiver and a first electrical output signal from the first transceiver to the network interface port of the first host device; and
packaging the second transceiver into a second connector configured to couple a second electrical input signal from a network interface port of a second host device to the second transceiver and a second electrical output signal from the second transceiver to the network interface port of the second host device,
the first and second transceivers being configured to perform clock and data recovery on the first and second electrical input signal to extract and re-modulate the first and second inbound data streams respectively as the first and second electrical transit signals conveying first and second transit data streams, configured to perform clock and data recovery on the second and first electrical transit signals to extract and re- modulate the second and first transit data streams as first and second outbound data streams conveyed by the first and second electrical output signals from the cable, and each configured to employ fixed, cable-independent, equalization parameters for clock and data recovery on the respective electrical input signals and for generating the respective electrical output signals.

12. The cable manufacturing method of claim 11, wherein the first and second transceivers are each configured to employ cable-dependent equalization parameters for generating the first and second electrical transit signals and for clock and data recovery on the second and first electrical transit signals.

13. The cable manufacturing method of claim 12, wherein the first and second transceivers are each configured to adapt the cable-dependent equalization parameters during operation.

14. The cable manufacturing method of claim 12, wherein the first and second transceivers are each configured to use preset cable-dependent equalization parameters during operation, and wherein the method further comprises: testing an assembled cable to determine the cable-dependent equalization parameters.

* * * * *